United States Patent
Faerber et al.

(10) Patent No.: US 9,842,137 B2
(45) Date of Patent: *Dec. 12, 2017

(54) PERFORMING COMPLEX OPERATIONS IN A DATABASE USING A SEMANTIC LAYER

(71) Applicant: SAP SE, Walldorf (DE)

(72) Inventors: Franz Faerber, Walldorf (DE); Daniel Baeumges, Viersen (DE); Tobias Mindnich, Walldorf (DE); Christoph Weyerhaeuser, Heidelberg (DE)

(73) Assignee: SAP SE, Walldorf (DE)

( * ) Notice: Subject to any disclaimer, the term of this patent is extended or adjusted under 35 U.S.C. 154(b) by 429 days.

This patent is subject to a terminal disclaimer.

(21) Appl. No.: 14/590,769

(22) Filed: Jan. 6, 2015

(65) Prior Publication Data

US 2015/0120699 A1 Apr. 30, 2015

Related U.S. Application Data

(63) Continuation of application No. 12/979,236, filed on Dec. 27, 2010, now Pat. No. 8,954,418.

(60) Provisional application No. 61/334,964, filed on May 14, 2010.

(51) Int. Cl.
*G06F 17/30* (2006.01)

(52) U.S. Cl.
CPC .. *G06F 17/30463* (2013.01); *G06F 17/30315* (2013.01); *G06F 17/30433* (2013.01); *G06F 17/30471* (2013.01)

(58) Field of Classification Search
CPC .............................................. G06F 17/30315
See application file for complete search history.

(56) References Cited

U.S. PATENT DOCUMENTS

| | | |
|---|---|---|
| 6,480,842 B1 | 11/2002 | Agassi et al. |
| 2004/0064449 A1 | 4/2004 | Ripley et al. |
| 2006/0026116 A1 | 2/2006 | Day et al. |
| 2008/0065640 A1 | 3/2008 | Shulman et al. |

(Continued)

OTHER PUBLICATIONS

Zhen He et al., "Self-tuning UDF Cost Modeling Using the Memory-Limited Quadtree," Advances in Database Technology—EDBT 2004, pp. 513-531, Feb. 11, 2004.

(Continued)

*Primary Examiner* — Grace Park
(74) *Attorney, Agent, or Firm* — Fountainhead Law Group P.C.

(57) ABSTRACT

The present invention includes a database with a semantic layer for performing standard SQL and complex operations custom to one or more application. In one embodiment the present invention includes receiving a data request from an application in a database, the data request specifying standard SQL operations and custom application operations to be performed for said application. The data request is processed in a semantic layer of the database. The semantic layer processes the standard SQL operations and the custom application operations and generates a logical execution plan comprising the standard SQL operations and the custom application operations. The logical execution plan is converted into a physical execution plan, which is executed by the database to generate a data result. The data result may be sent back to the application.

20 Claims, 14 Drawing Sheets

(56) References Cited

U.S. PATENT DOCUMENTS

2009/0193006 A1* 7/2009 Herrnstadt ........ G06F 17/30315
2010/0153349 A1* 6/2010 Schroth ............ G06F 17/30306
              707/693

OTHER PUBLICATIONS

Surajit Chaudhuri, "An Overview of Query Optimization in Relational Systems," ACM, 1998.
Surajit Chaudhur et al., "Optimization of queries with User-Defined Predicates," ACM Transactions on Database Systems, vol. 24, No. 2, Jun. 1999.
Sara Cohen, "User-Defined Aggregate Functions: Bridging Theory and Practice," SIGMOD '06, Jun. 27-29, 2006.
"User-Defined Functions," Complete Guide toDB2 Universal Database. Section 6.4, pp. 310-373, Jan. 1, 1998.
Extended European Search Report, dated Aug. 26, 2011, from a corresponding foreign application, EP 11003923.7.

* cited by examiner

PERFORMING COMPLEX OPERATIONS IN A DATABASE USING A SEMANTIC LAYER

CROSS REFERENCE TO RELATED APPLICATIONS

The present disclosure is a continuation of U.S. application Ser. No. 12/979,236 for "Performing Complex Operations in a Database Using a Semantic Layer" filed Dec. 27, 2010, which claims priority to U.S. Provisional App. No. 61/334,964 for "Performing Complex Operations in a Database System" filed May 14, 2010, both of which are incorporated herein by reference in its entirety for all purposes.

BACKGROUND

The present invention relates to computing, and in particular, to systems and methods for performing complex operations in a database using a semantic layer.

Unless otherwise indicated herein, the approaches described in this section are not prior art to the claims in this application and are not admitted to be prior art by inclusion in this section.

FIG. 1 shows a typical application and database. Application 101 may store data in and retrieve data from database 102. Typically, application 101 generates structured query language (SQL) statements and sends the SQL statements to database 102. The SQL statements may be received in a SQL parser 103 to examine the structure of the SQL, optimized by optimizer 104, and executed on the database using a relational engine 105 to store or retrieve data 106. The SQL statements received by database 102 may specify some limited processing of the data when the SQL statements are executed.

However, the ability of SQL to implement complex operations is very limited. Typically, application programmers design applications so that data is retrieved into the application for complex application processing. This is sometimes referred to as bringing the data to the code (i.e., the application code). However, transporting large amounts of data from the database to the application can be processor intensive and inefficient. It would be generally desirable to push more application processing down to the database.

The present disclosure addresses these and other issues by performing complex operations in a database using a semantic layer.

SUMMARY

The present invention includes a database with a semantic layer for performing standard SQL and complex operations custom to one or more application. In one embodiment the present invention includes receiving a data request from an application in a database, the data request specifying standard SQL operations and custom application operations to be performed for said application. The data request is processed in a semantic layer of the database. The semantic layer processes the standard SQL operations and the custom application operations and generates a logical execution plan comprising the standard SQL operations and the custom application operations. The logical execution plan is converted into a physical execution plan, which is executed by the database to generate a data result. The data result may be sent back to the application.

The following detailed description and accompanying drawings provide a better understanding of the nature and advantages of the present invention.

DETAILED DESCRIPTION

Described herein are techniques for enhancing the functionality of a database. The apparatuses, methods, and techniques described below may be implemented as a computer program (software) executing on one or more computers. The computer program may further be stored on a non-transitory computer readable medium. The computer readable medium may include instructions for performing the processes described below. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
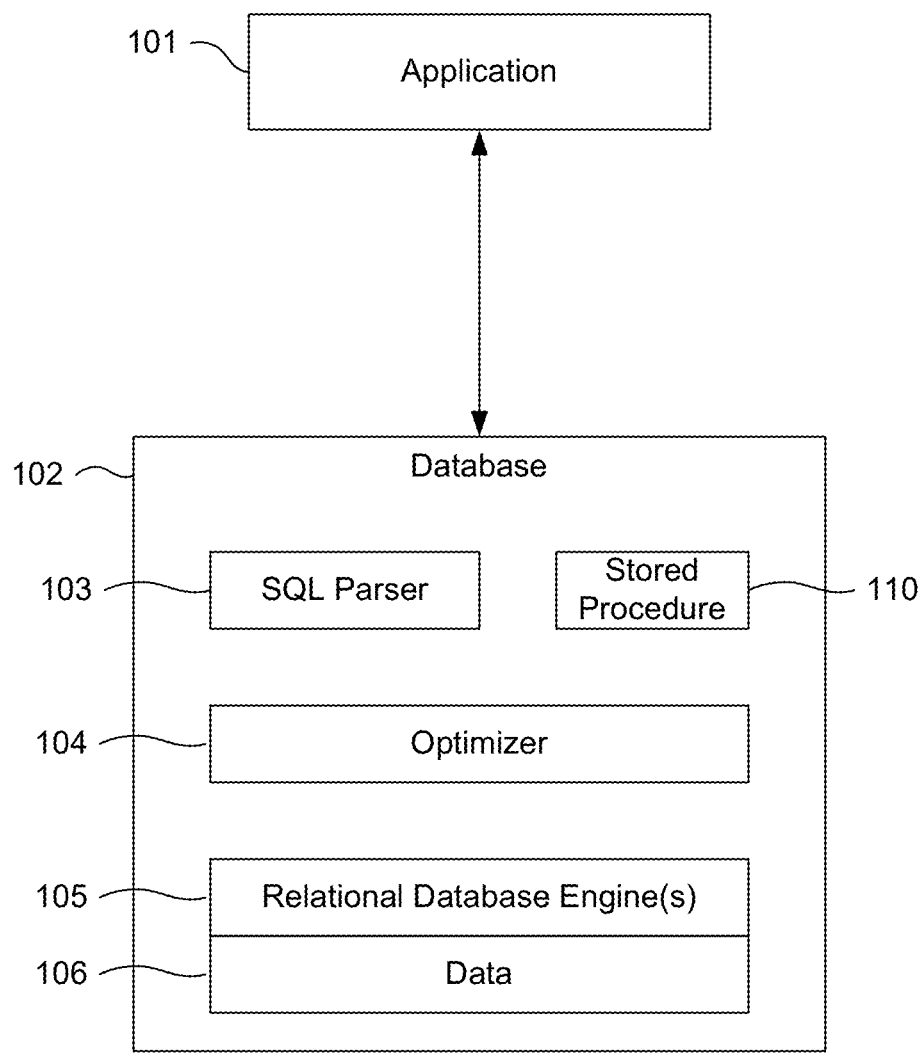
FIG. 1 shows a typical application and database.
Figure 2:
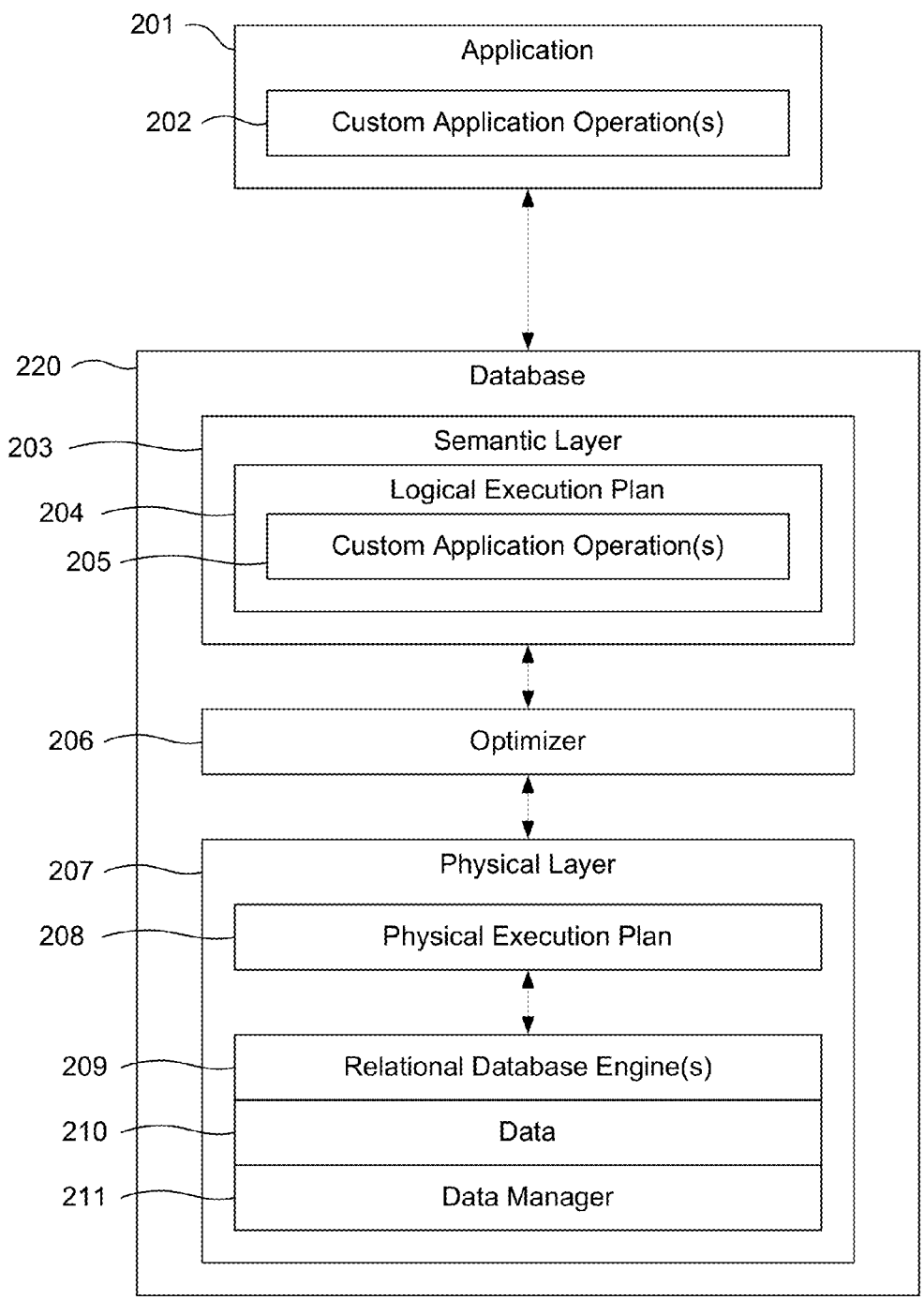
FIG. 2 shows an application and database according to an embodiment of the present invention.

FIG. 2 shows an application and database according to an embodiment of the present invention. Features and advantages of the present invention include increasing the functional capacity of the database to offload custom application operations to the database. For instance, application 201 may perform custom application operations 202. Custom application operations may include business logic, planning operations (e.g., financial planning), analytic operations on custom data structures, or application specific logic, for example. Embodiments of the present invention allow custom operations typically performed by retrieving data from the database back to the application to be performed in the database, for example.

Database 220 includes an example configuration for a semantic layer 203, an optimizer 206, and a physical layer 207. In one embodiment, semantic layer 203 receives custom application operations and standard SQL statements and processes the custom application operations and standard SQL statements to generate a logical execution plan (also referred to herein as a "semantic execution plan"). Standard SQL may be a variety of implementations of basic SQL operable in databases. As described in more detail below, some embodiments of semantic layer 203 may receive multiple types of inputs from one or more applications that extend the capabilities of traditional (or standard) SQL and support execution of custom application operations and traditional SQL statements native to database 220, for example. Embodiments of the present invention may support multiple different applications with different custom application operations executing such different custom application operations in the same database 220, for example.

A data request may be received in database 220 from application 201 with instructions specifying custom application operations to be performed on particular data in database 220, for example. The data request may further specify traditional SQL operable in database 220. As illustrated by this example, semantic layer 203 generates a logical execution plan 204 in response to receiving the data request. Logical execution plan 204 includes custom application operations 205 and may include standard SQL statements as well, for example.

Logical execution plan 204 is received by optimizer 206. Optimizer 206 converts the logical execution plan 204 into a physical execution plan 208. Physical execution plan 208 comprises native executable database operations. Physical execution plan 208 is the steps for actually performing the query to retrieve the data. Physical execution plan 208 comprises low level executable instructions for performing the processing operations represented in the logical execution plan 204. Physical execution plan 208 is the result of the query optimizer's calculation of the most efficient way to implement the application request represented by logical execution plan 204.

Physical execution plan 208 is received and executed by relational database engine 209. In response to executing physical execution plan 208, data 210 may be accessed, and the operations specified by the data request from application 201, including the custom application operations, may be performed. Relational engine 209 generates a data result, and the data result may be sent from database 220 to application 201, for example.

Figure 3:
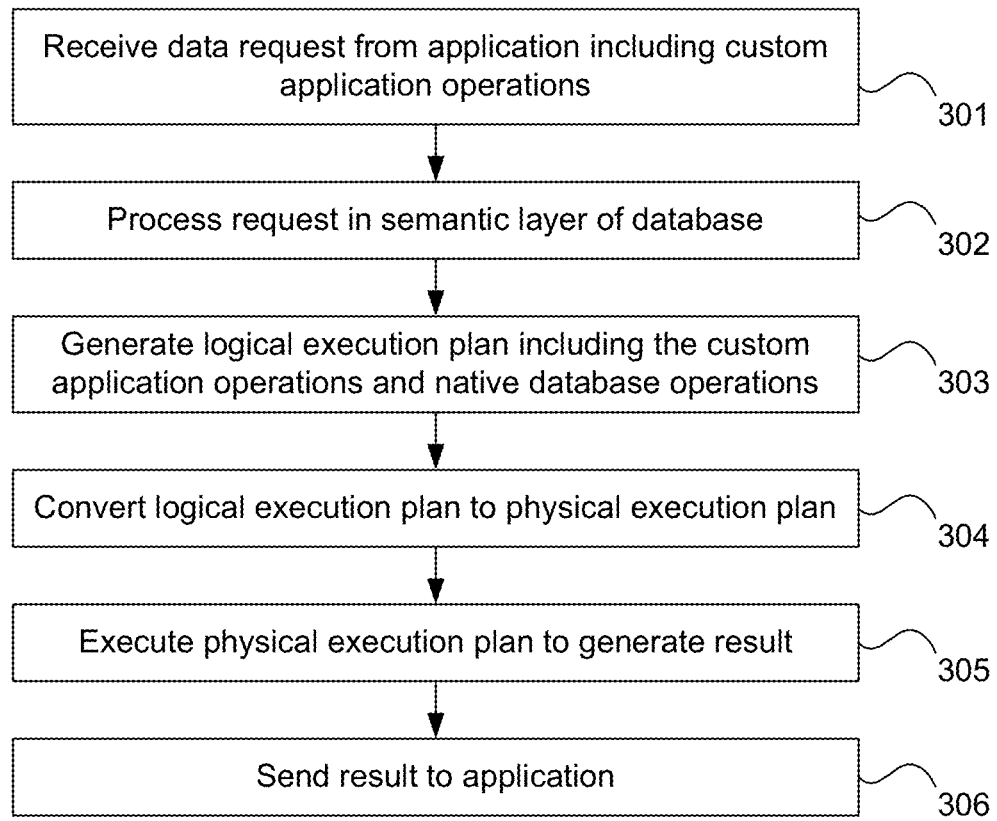
FIG. 3 shows a method according to an embodiment of the present invention.

FIG. 3 shows a method according to an embodiment of the present invention. At 301, a data request is received from an application. The data request may specify custom application operations and standard SQL operations, for example. At 302, the data request is processed in the semantic layer of the database. At 303, the semantic layer generates a logical execution plan including custom application operations and, for example, SQL. At 304, the logical execution plan is converted into a physical execution plan. The physical execution plan comprises native executable database operations. At 305, the physical execution plan is executed to generate a data result. At 306, the data result is sent from the database to the application.

Figure 4:
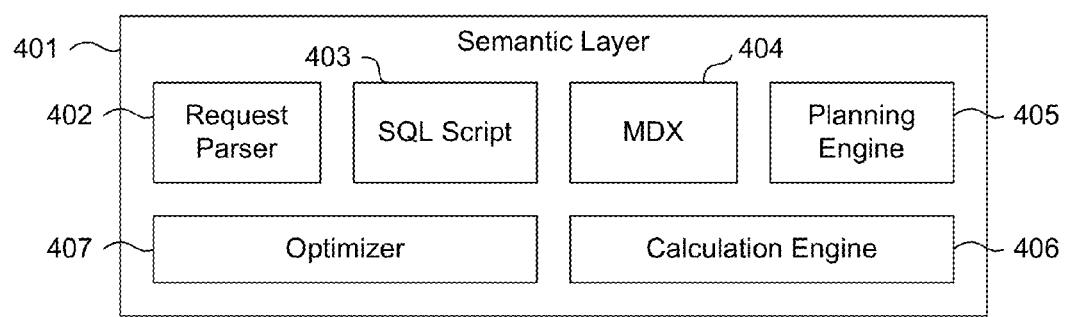
FIG. 4 shows an example semantic layer according to an embodiment of the present invention.

FIG. 4 shows an example semantic layer 401 according to an embodiment of the present invention. Semantic layer 401 includes the following software components for processing different types of requests: a request parser 402, SQL Script 403, MDX 404, and planning engine 405. Request parser 402 analyzes the received request and dispatches the request to the appropriate component. SQL Script component 403 processes requests comprising a script specifying certain custom application operations. For example, a SQL scripting capability may be used to perform application specific calculations in the database. MDX component 404 receives and processes MultiDimensional Expressions ("MDX") for analytic operations and support for multidimensional queries. Planning engine 405 processes requests for planning operations in support of planning applications, such as financial planning applications, for example. One example of a planning operation is disaggregation. Another example of planning operations are statistical functions.

In one embodiment, different inputs to the semantic layer 401 are used to generate a model for controlling the flow of data to implement the desired operations. The model may be part of the logical execution plan, for example. In such an implementation, requests from applications may be processed by the above-described components and incorporated into the model. In one embodiment, the model (or calculation model) is represented by a data flow graph. In this example, semantic layer 401 further includes a calculation engine 406 for processing the model. Calculation engine 406 may produce a logical execution plan and incorporating the custom application operations from the request. Optimizer 407 converts the logical execution plan into a physical execution plan.

Example Implementation of Database

Figure 5:
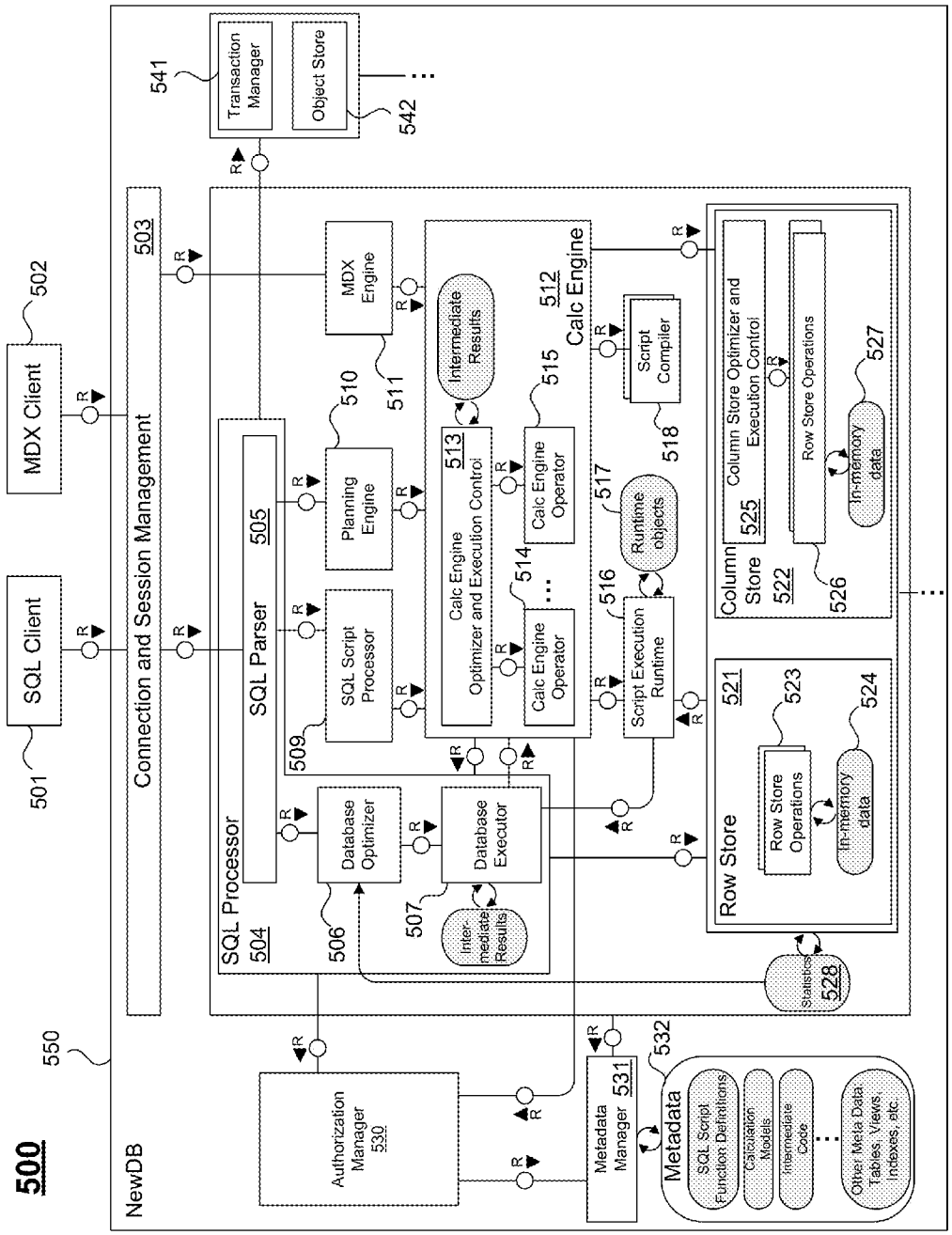
FIG. 5 shows an example database architecture according to an embodiment of the present invention.

FIG. 5 shows an example database architecture 500 according to an embodiment of the present invention. Database 550 may receive input requests from one or more applications illustrated here as a SQL client 501 and/or an MDX client 502. Connection and session management component 503 creates and manages sessions and connections for the database clients. For each session a set of parameters is maintained such as, for example, auto commit settings or the current transaction isolation level. Once a session is established, database clients typically use SQL statements and the input mechanisms described below to communicate with database 550. For analytical applications, the multidimensional query language MDX may be used, for example. Session layer 503 forwards requests to SQL processor 504 or to the MDX processor 511. SQL extensions may be used to define and invoke SQL Script functions and to interact with a planning engine as described below.

In this example, each statement is processed in the context of a transaction. New sessions are implicitly assigned to a new transaction. Transaction manager 541 is the component that coordinates database transactions, controls transactional isolation, and keeps track of running and closed transactions. When a transaction is committed or rolled back, the transaction manager informs the involved engines about this event so they can execute necessary actions.

Metadata can be accessed via the metadata manager component 531. Metadata 532 in database 550 comprises a variety of objects. Examples are the definition of relational tables, columns, views, and indexes, the definition of SQL Script functions, calculations models, intermediate code, and object store metadata. Metadata 532 of all these types may be stored in one common catalog for all database stores (in-memory row store, in-memory column store, object store, disk based) or in a Repository. Object store 542 is an in-memory store for graph-like structures represented by networks of objects. It is used, for example, for optimization and planning tasks that operate on large volumes of graph-like data, such as in supply chain management, for example.

Authorization manager 530 is invoked by other database components to check whether the user has the required privileges to execute the requested operations (e.g., based on roles). A privilege grants the right to perform a specified operation (such as create, update, select, execute, and so on)

on a specified object (for example a table, view, SQL Script function, and so on). Authorization manager 530 may control analytic privileges that represent filters or hierarchy drilldown limitations for analytical queries. Analytical privileges grant access to values with a certain combination of dimension attributes. This could for example be used to restrict access to a cube with sales data to values with dimension attributes region='US' and year='2010'. As analytical privileges are defined on dimension attribute values and not on metadata, they are evaluated dynamically during query execution. Users are authenticated either by the database (login with user and password) or authentication can be delegated to an external authentication provider.

SQL processor 504 includes SQL parser 505, database optimizer 506, and database executor 507. This reflects the fact that they belong to the processing chain for standard SQL queries. Inside SQL processor 504, the SQL parser 505 analyzes the SQL statement and forwards it to responsible component (e.g., SQL Script processor 509 or planning engine 510). Data definition statements (such as CREATE TABLE, ALTER TABLE, DROP TABLE and so on) are forwarded to metadata manager 531. Transaction control statements (begin transaction, rollback, commit) are delegated to the transaction manager 541. Object store invocations are forwarded to database object store 542. Invocations of planning operations are forwarded to the planning engine 510. SQL Script function definitions (CREATE FUNCTION) and function calls are handled by the SQL Script processor 509. SQL data manipulation statements are executed by SQL processor 504. The SQL parser 505 analyzes the statement and creates the logical execution plan that is given to the database optimizer.

FIG. 5 illustrates a request channel between the script execution runtime and the SQL processor. This reflects the option to include SQL statements in scripts. The request channel allows the SQL processor 504 to invoke the calculation engine 512 ("calc engine"). In some embodiments, calculation models are exposed as a special type of database views called calculation views specifying the logical execution of steps to be performed. Calculation views can be used in SQL queries and they can be combined with tables and standard views using joins and sub queries. When such a query is executed, the database executor inside the SQL processor 504 invokes the calc engine 512 to execute the calculation model behind the calculation view. Accordingly, calc engine 512 and SQL processor 504 call each other. On the one hand, calc engine 512 may invokes the SQL processor 504 for executing set operations and SQL nodes, and on the other hand, the SQL processor 504 invokes the calc engine 512 when executing SQL queries with calculation views.

Database 550 supports standard SQL with a set of database specific extensions. With SQL Script, database 550 provides a set of SQL extensions that allow application programmers to execute custom application operations (e.g., application-specific logic) inside the database layer. SQL Script allows the definition of functions that are similar to database stored procedures, but with a restricted programming model that allows for better optimization and parallelization. Database 550 also supports MDX multidimensional queries. MDX can be used to connect a variety of analytics applications including, for example, SAP® Business Objects® products and clients such as Microsoft® Excel®. Database 550 may provide the following client libraries: JDBC driver for Java clients, ODBC driver for Windows clients, especially for MS Office integration, database specific DBSL for running the ABAP application server, a database client module for Python, implementing Python DB API, ODBO (OLE DB for OLAP) provider for MDX, and the SQLDBC library which is the basis for MDX provider and for Python integration.

The semantic layer of database 550 extends standard SQL in multiple ways. For example, the semantic layer may provide creation of tables as row or column tables and conversion between both storage formats. When creating a table, it can be defined whether it will be a row based table or a columnar table. It can be configured whether tables are by default created as row based or as columnar tables. Further, a naming schema may be defined that specifies the category of a table based on its name prefix. Row based tables can be converted into columnar tables and vice versa. Additionally, the semantic layer supports defining and querying temporal tables, and further supports column views that provide SQL access to features of column store 522 such as OLAP views (with star schema metadata), join views (parameterized join based views) and calculation views for accessing calculation models that represent complex parameterized operations. The system further includes SQL based invocation of object store 542. The operations provided by the database planning engine 510 are also available as SQL extensions. Application developers may call planning engine operations using corresponding modules in the application, for example. Several SQL statements are extended to allow the specification of additional database-specific parameters. Parameters can, for example, be used to specify additional properties when creating or altering a table. The following statement, for example, creates a table in column store 522 with column B compressed using run length encoding: CREATE COLUMN TABLE T1 (A INT PRIMARY KEY, B INT) WITH PARAMETERS ('COMPRESSION'=('B', 'RLE')) SQL Script extensions define and call functions and define table types, for example. An detailed example of SQL Script is provided below.

SQL Script 509, MDX 511, and the planning engine 510 interface can be seen as domain-specific programming languages or models that can be used to interact with database 550. Artifacts in the different domain-specific languages embedded in requests to the database are translated by their specific compilers into a common representation (e.g., a "calculation model"). Once the different artifacts are compiled into this unified model, they may be processed and executed in the same way, for example. The execution of the calculation models is the task of the calc engine 512. A calculation model is a directed acyclic graph with arrows representing data flows and nodes that represent operations. Each node has a set of inputs and outputs and an operation that transforms the inputs into the outputs. In addition to their primary operation, each node can also have a filter condition for filtering the result set. The inputs and the outputs of the operations are table valued operands. Inputs can be connected to database tables or to the outputs of nodes. Calculation models support a variety of node types. For example, some nodes may be used for set operations such as projection, aggregation, join, union, minus, intersection, and SQL nodes may execute a SQL statement which is an attribute of the node. For statistical calculations, nodes of type R-operation can be used (the calculation performed by such a node is described using the R language for statistical computing), and for complex operations that cannot be described with a graph of data transformations, scripting nodes can be used (the function of such a node is described by a procedural script in Python or JavaScript or "L"). To enable parallel execution, a calculation model may contain split and join operations, where a split operation is used to partition input tables for subsequent processing steps based on partitioning criteria. Operations between the split and join operation may then be executed in parallel for the different partitions. A calculation model can be defined as part of database metadata and invoked multiple times or created on-the-fly.

When calc engine 512 gets the request to execute a calculation model, it first optimizes the model using a rule based model optimizer 513. Examples for optimizations performed by the model optimizer are "pushing down" filters and projections so intermediate results are narrowed down earlier, or the combination of multiple aggregation and join operations into one node. Also, not requested paths and attributes may be removed from the data flow graph. Of course, such optimizations may not be possible for scripted nodes. The optimized model is then executed by calc engine's model executor part of 513. This includes decisions about parallel execution of operations in the calculation model. The model executor invokes the required operators 514-515 and manages intermediate results. Some operators are executed directly in calc engine (for example creating the union of several intermediate results).

For calculation models that contain scripting nodes in a compiled language, calc engine 512 may invoke the corresponding compiler 518 at the time the calculation model is defined. Scripts in "L", for example, are compiled into intermediate code using a Low Level Virtual Machine (LLVM), for example. The intermediate code is stored as part of database metadata. When the calculation model is executed, scripted operations are processed by invoking the corresponding script execution runtime 516. When the script is called the first time, the intermediate code is compiled into runtime objects 517 (native code) that can be directly executed. The runtime objects 517 are cached and can be reused for subsequent invocations. The remaining nodes of the calculation model (not implemented in calc engine and not scripted) are transformed into a set of logical database execution plans. Multiple set operation nodes are combined into one logical database execution plan if possible.

The logical database execution plans are processed in the same way as the execution plans created from standard SQL statements that were sent by the client. The logical execution plans are given to the database optimizer 506, which applies algebraic transformations and cost based optimizations based on database statistics 528. The result of the optimization is the physical execution plan. Creating the physical execution plan includes choosing the physical operators to be applied—for example using an index scan instead of a full table scan or executing a logical join operation using the physical BTREE INDEX JOIN operator. Database 550 supports statements that involve tables from different engines such as, for example, row store 521 and column store 522. In some embodiments, joins or unions are built between row based and column based tables. The physical execution plan is given to the database executor 507. The database executor 507 controls the execution of the plan operations by invoking the corresponding operators of column store 521 and row store 522. The physical execution plan indicates which operations are dependent on each other and which may be executed concurrently. Based on this information, the executor may execute operations in parallel. Embodiments of SQL script may include user defined functions for aggregation, filtering and so on. FIG. 5 shows a channel that will allow the respective operators (such as aggregate, filter, scan) to invoke the script execution runtime 516 for computing user defined functions. Database executor 507 directly invokes the operators in row store 521 and column store 522 that implement the physical execution plan operations for row store operations 523 and for column store write operations 526. In this example, for read operations the physical execution plan created by SQL processor 504 does not contain fine granular column store plan operations. Instead SQL processor 504 combines column store related read operations into a single plan operation that represents a complex query against column store 522. Column store 522 includes an optimizer and execution control 525 for processing this type of query. Calc engine 512 may directly call column store operations 526 without using the SQL processor 504. In other embodiments, calc engine 512 may access both column store 522 and row store 521 through SQL processor 504. Row store operations 523 may operate on in-memory data 524 and column store operations 526 may operate on in-memory data 527.

Example SQL Scripting

Database 550 supports a language ("SQL Script") for processing application-specific code in the database. To execute application operations in the database layer, the system invokes application-specific logic in the database, such as a function for currency conversion. SQL Script may be used to write this kind of function. SQL Script has a programming model based on side effect free functions that process table-like data using SQL statements. SQL Script also allows implementation of functions using procedural code free of side effects. SQL Script has several features including: functions that can return multiple results; complex functions that can be decomposed into smaller functions to enable modular programming, reuse, and a better understandability by functional abstraction; support for local variables for intermediate results with implicitly defined types; and control logic such as if/else and throw/catch.

The main concept in SQL Script is the function. SQL Script functions can have multiple input and output parameters. They are composed of calls of other functions, and of SQL queries. Intermediate results can be assigned to variables that are local to the function. Basic control flow is possible via if/else. A SQL Script function is free of side effects, which means it computes the values of the output parameters but modifies no other data. Being free of side effects also means that SQL statements which modify data (delete, update, insert) are may not be included inside SQL Script functions. These restrictions ensure that two function calls that are not connected via data flows can be executed in parallel. SQL Script can be used for writing complex functions that have table like parameters as input and output. These functions are named table functions. They contain SQL queries and calls to other functions. Table functions can be called directly by the client via SQL. Embodiments may further support user defined functions that can be used as a part of SQL statements. Examples are aggregate functions in the select list, expressions for sorting, functions in join conditions or functions used in filtering expressions in the where clause. SQL Script may support both scalar functions (which compute primitive output values from primitive input values) and grouping functions (which compute primitive output values from table-typed input values). Further, SQL Script allows creation of template functions with type parameters similar to templates in C++ or generics in Java. By supplying concrete types for the type parameters of the template a concrete table function is instantiated. SQL Script supports the primitive data types of SQL and extends SQL with defined table types. In SQL Script the data types of function parameters may be declared. If a parameter is a table, the type can be specified by specifying a database table or a table type. A table type defines the names and the types of columns without creating a table on the database. Table types can be used as types for input or output parameters of SQL Script functions. SQL Script may further include a procedural programming language, such as a safe subset of a C++-like language with classes, a numerical library, and functions for statistical computation such as linear regression and forecasting.

The following is an example of SQL script for a cluster analysis problem. In this example, customer profiles are assigned to customer categories that are defined by reference profiles. In this simple example the profiles are vectors of integer values. To keep the example readable the profiles have only 3 parameters p1, p2 and p3. The function implements a simple clustering algorithm: For each profile to be categorized, the vector distances between the profile and all reference profiles are calculated. The profile is assigned to the cluster where the difference to the reference vector is minimal. First, three table types are defined: "type_profile" is type of the tables with the profiles and the reference profiles. "type_distance" has rows that store the distance between two profiles. "type_clusters" is the type of the result table that stores for each profile id the assigned cluster id and the distance to the cluster's reference profile.
Code:

```
create table type type_profile(id int,p1 int, p2 int, p3 int)
create table type type_distance(id1 int,id2 int, dist int )
create table type type_clusters (id int, clusterid int, dist int)
```

Table function "get_distances" takes two profile tables as parameters and returns a table that contains the square of the distance for each pair of profiles from the two tables.
Code:

```
create function get_distances (  IN intab1 type_profile,
                                 IN intab2 type_profile,
                                 OUT disttab type_distance )
begin
   disttab = select v1.id as id1,v2.id as id2,
      (v1.p1 - v2.p1)*(v1.p1 - v2.p1)+
      (v1.p2 - v2.p2)*(v1.p2 - v2.p2)+
      (v1.p3 - v2.p3)*(v1.p3 - v2.p3) as dist
      from @intab1@ as v1,@intab2@ as v2;
end
```

Table function "get_clusters" computes the assignment of profiles to the clusters that are defined by the reference profiles. It first calls function "get_distances" to get a table with the distances between all profiles and all reference profiles. Note that in the call the input parameters are embraced with "@". This indicates that the value of a parameter or variable is passed. This is different for the output parameter. Here an implicitly defined new local variable "dist_t" is passed. The "@" is not used here because the variable name is passed, not the value. The function call is followed by a SQL statement that uses grouping and aggregation to determine the minimum distance for each profile. The result is stored in a temporary table that is assigned to the table-typed variable "min_t". The type of this variable and the structure of the temporary table need not be declared because it is derived from the SQL statement. The last statement is a SQL join that is needed to get, for each profile, the identifier of the reference profile, which has the minimum distance. The result of this query is assigned to the output parameter "clusters_t."
Code:

```
create function get_clusters (IN i_profile type_profile,
                              IN i_refs type_profile,
                              OUT clusters_t type_clusters)
begin
   calls get_distances(@i_profile@, @i_refs@, dist_t);
   min_t = select id1 as id, min(dist) as mindist from @dist_t@ group by id1;
   clusters_t = SELECT m.id, d.id2 as clusterid, m.mindist as dist
      from @min_t@ as m inner join @dist_t@ as d
      on m.id=d.id1 and m.mindist = d.dist;
end
```

With the following table definitions that match the type definitions, the "get_clusters" function can be invoked with the CALLS SQL extension (call script): After this call, the result is available in target table "clusters".
Code:

```
create table profiles (id int primary key,p1 int, p2 int, p3 int)
create table refprofiles( id int primary key,p1 int, p2 int, p3 int)
create table clusters (id int primary key, clusterid int, dist int)
 . . . /* fill the tables with data */ . . .
calls get_clusters( profiles, refprofiles, clusters)
```

Example Hardware

Figure 6:
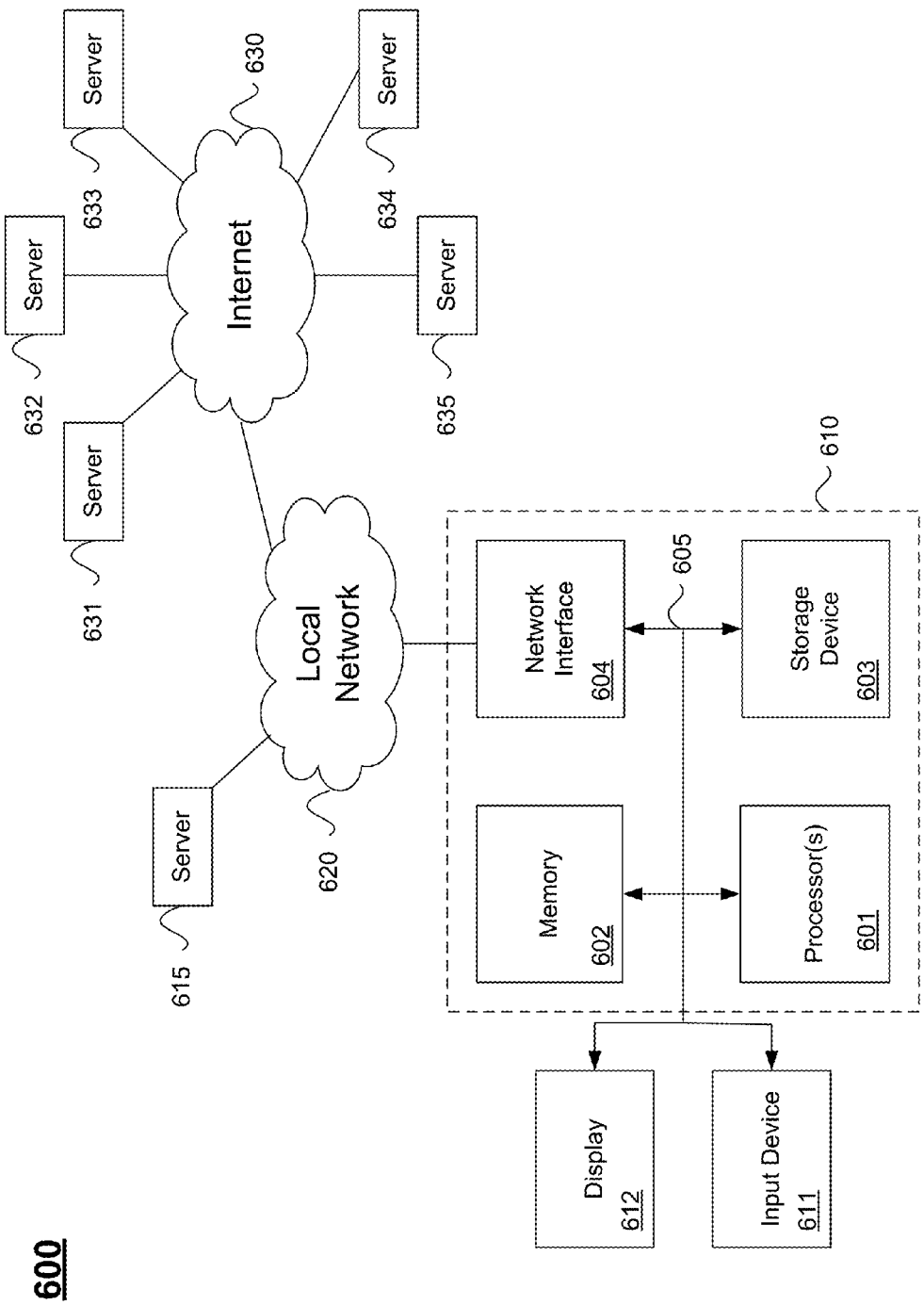
FIG. 6 illustrates hardware of a special purpose computing machine configured with a process according to embodiments of the present invention.

FIG. 6 illustrates hardware of a special purpose computing machine configured with a process according to embodiments of the present invention. An example computer system 610 is illustrated in FIG. 6. Computer system 610 includes a bus 605 or other communication mechanism for communicating information, and one or more processors 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. In the Internet example, software components or services may reside on multiple different computer systems 610 or servers 631-635 across the network. Servers may include memory, processors, storage devices, and network interfaces as described with reference to computer 610. The processes described above may be implemented on one or more servers, for example. As mentioned above, a memory 602 on a server may include shared memory, and an application server and database server may be operable on a single server system, where one or more processors 601 execute instructions for performing the functions of one or more applications and databases as described above. Alternatively, server 631 may transmit actions or messages from one component, through Internet 630, local network 620, and network interface 604 to a component on computer system 610. The software components and processes described above may be implemented on any computer system and send and/or receive information across a network, for example.

Further Example Implementation

Language Handling in an Example Database ("DB")

Execution in DB is based on a dataflow graph consisting of plan operations and plan data. DB distinguishes between a physical execution plan, which can be executed by a distributed execution engine directly and a semantic (logical) execution plan (e.g., calculation node) which specifies operations on a more abstract level. During runtime the semantic plan (e.g., a dataflow graph) is optimized and compiled into the physical execution plan. Language support may be realized by integrating an interpreter (e.g., python) into the engine and running scripts on different levels: either as user extensions, as API extensions, as a user defined plan operation, or using the techniques set forth in the examples above.

DB includes an approach for language support. One goal of this approach is to allow enterprise applications to run data-intensive functions directly in DB instead of running them on the client which usually results in a poor application performance. This approach generalizes in multiple dimensions. First we want to be independent of the language itself (i.e., the applications can use a language of their choice). Second, the language is not directly interpreted, but first compiled into a DB semantic execution plan that can be optimized. This execution plan can contain user defined code snippets that provide functions beyond the standard plan operations. These code snippets are either executed by an interpreter or compiled via Low Level Virtual Machines (LLVM) into an executable routine. Moreover, the native interpreter (e.g., python) support will still be available.

Query Execution in DB

The following is a high level overview of query execution in DB, which may be used for language support.

Semantic Execution Plan

A semantic execution plan in DB defines operations on top of database tables or on other more complex data sources such as data cubes. That way, a semantic plan can be used to express complex analytical queries for OLAP scenarios or any other kind of calculations on top of the base tables. Examples for operations in a semantic execution plan include aggregation operations, join operations, unions, etc. Each operation in a semantic plan produces a "calculated view" whereas different operations can be stacked on top of each other. Moreover, for applications such as OLAP it may be important to be able to specify which calculated views in a semantic plan should be materialized (because a consumer wants to read the results) and which view should not be materialized.

Figure 7:
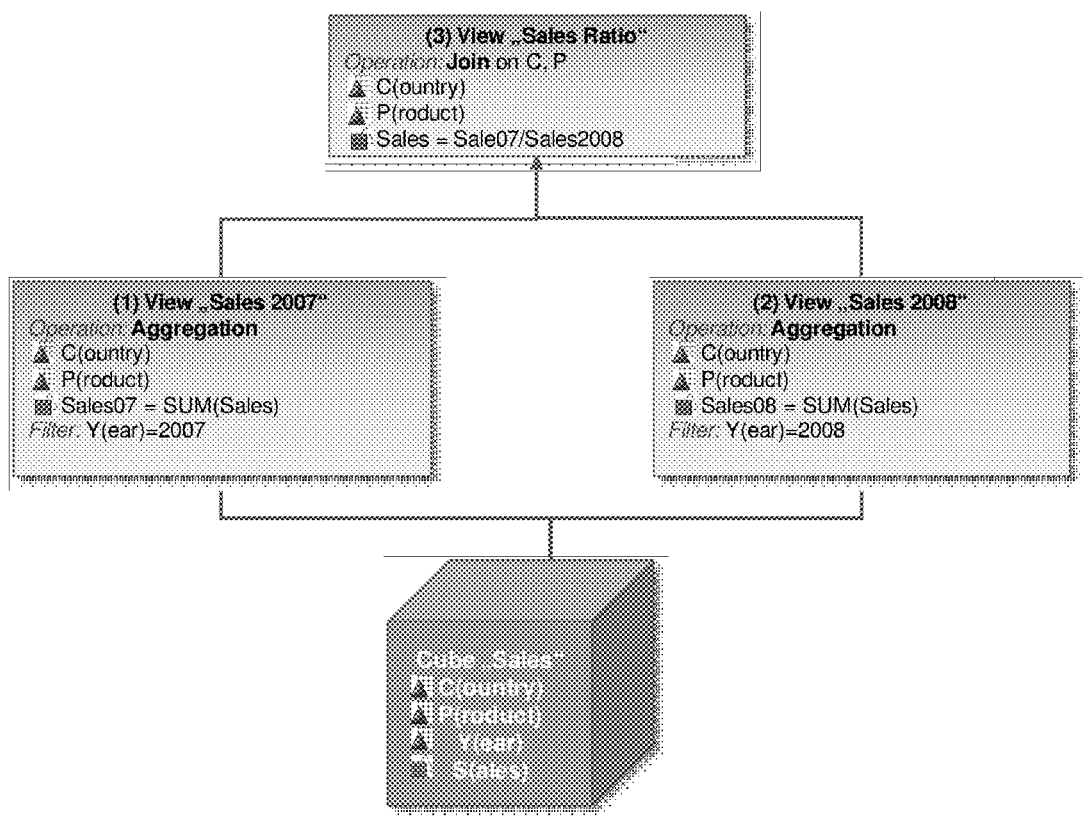
FIG. 7 shows an example of a semantic (or logical) execution plan.

FIG. 7 shows an example of a semantic execution plan. The following example shows a semantic plan that calculates the ratio of the sales in 2007 to 2008 grouped by country and product. The semantic execution plan shown in FIG. 7 defines three operations on top of a cube that holds sales information (as key figure) grouped by year, country and product (as dimensions): The first operation (1) calculates the sum of sales for year "2007" grouped by country and product, the second operation (2) calculates the sum of sales for year "2008" again grouped by country and product, and the final operation joins the results of these two views and calculates the ratio of the sales per country and product.

A semantic execution plan can either be defined during design time and stored as a template in DB (e.g., similar to a view in a database) or it can be created on the fly during runtime (e.g., using a SQL query as input). In general, a semantic execution plan may not contain any concrete information that is relevant for execution (e.g., location of the data). During runtime, a semantic plan gets instantiated and further restrictions can be added on top of the result (e.g. filter conditions such as 'country="Germany"' or projections to certain dimensions). For executing a semantic execution plan, different strategies exist: (1) The complete plan is optimized and compiled into a physical execution plan or (2) some or all operations are interpreted at runtime which enables on the fly optimizations (e.g., decide about the join strategy).

Physical Execution Plan

A physical execution plan includes the physical plan operations and the plan data. Physical plan operations (represented by squares) implement the data processing functionalities that are to be executed. Plan data (represented by arrows) connect the plan operations. The following example shows schematically a physical plan that can be used to implement the calculated view "Sales 2007" in FIG. 7.

Figure 8:
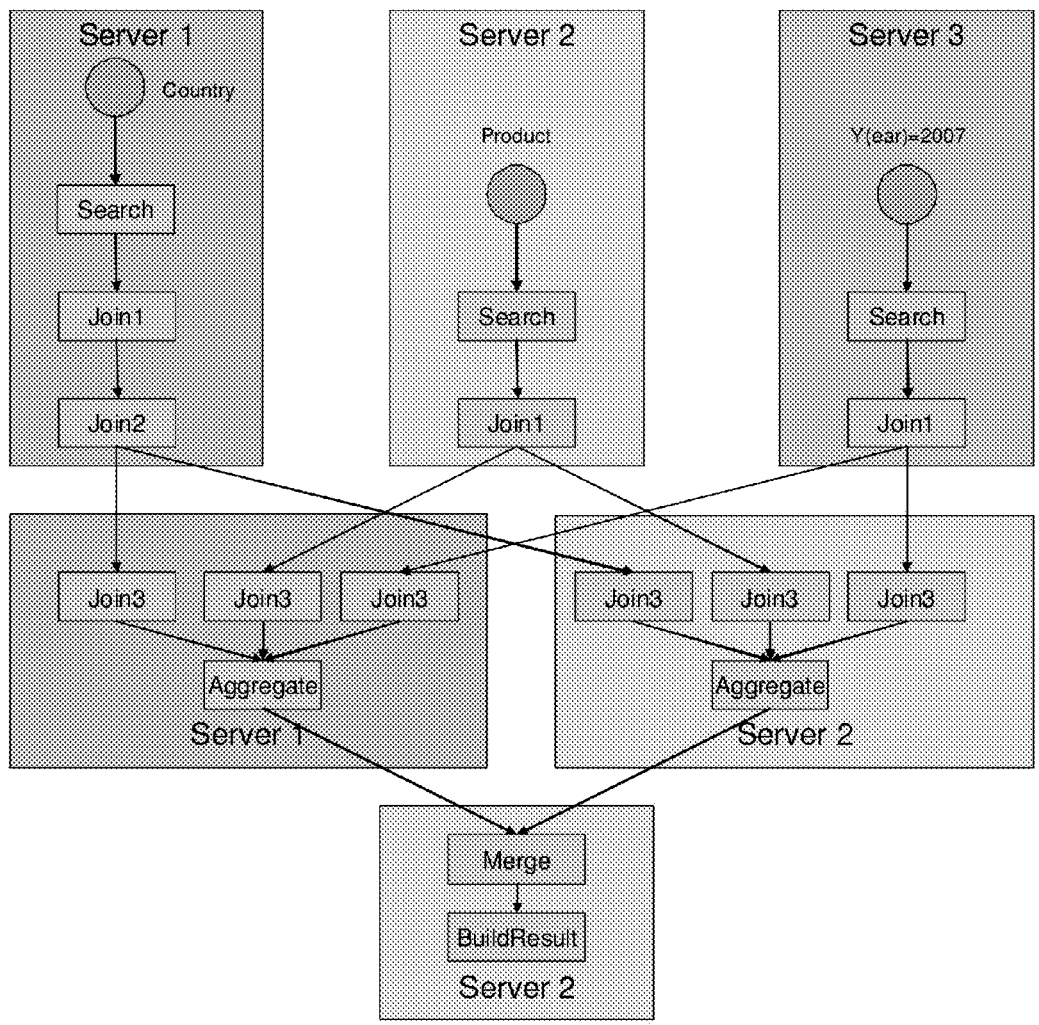
FIG. 8 shows an example of a physical execution plan.

FIG. 8 shows an example of a Physical Execution Plan. It can be seen that a semantic operation is translated into one or more physical operations. For example, in order to read data from a cube a set of operations is necessary. Moreover, if data is partitioned over multiple servers the physical execution plan can parallelize operations and merge results later during execution. In general, physical execution plan operations may be defined by their inputs, the operation itself and the locations (server) where they are executed. A plan operation produces one or multiple outputs, which are either the final result of the plan or are inputs for other plan operations. Plan data can be any kind of data which is derived from a base class called "plan data". This class defines an interface that concrete plan data may implement which contains methods to serialize and deserialize data for being transferred via the network. A plan operation can be executed, if its input plan data is available. Examples for plan operations are "Merge" of portioned results, Materialization of results (i.e., the operation "BuildResult"), search, and join operations. The execution engine executes the plan directly by executing the plan operations (e.g., implemented in C++) and transferring the plan data to the corresponding servers.

Low Level Virtual Machines (LLVM) for Executing Custom Code

Previously, the standard means to incorporate user-defined functionality in a database may include implementing a custom plan operation in python. This has two major drawbacks. One is that the application language is most likely not Python. Second the execution of Python code within the engine is expensive.

To overcome these limitations the disclosed DB may compile custom user functions written in a domain specific language (DSL) or an application language, for example, that may not be expressed using standard operations in DB into low-level byte-code using LLVM. The bytecode can also be compiled into a memory block of native code that is directly executable.

In both cases a generic plan operation within the semantic plan executes the custom code snippets on the input data. This allows the DB to be language independent and to execute code snippets much faster than using a python interpreter.

Example Use Cases

In the current development there are two main use cases for the semantic execution plan (also called semantic layer) which are the calculation of complex OLAP functions within DB as well as expressing business planning functionality. In DB the semantic plan may be used for any kind of functionality which that is expressed on top of the native SQL engine.

OLAP Operations

Figure 9:
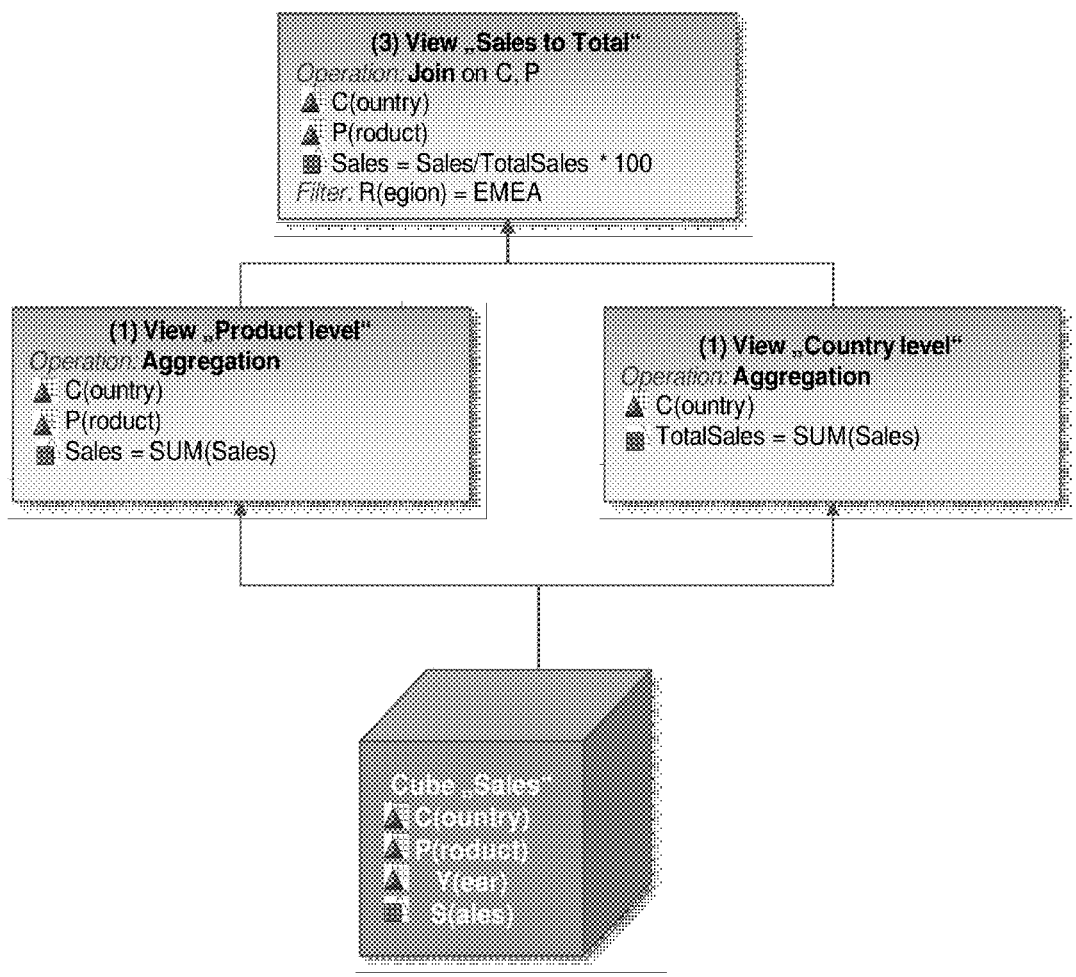
FIG. 9 shows an example semantic execution plan to calculate ratios on different aggregation levels.

To illustrate the capabilities of the semantic layer expressing complex OLAP consider calculating a ratio to total for a set of products sold in different countries in region EMEA (where the region information is provided as a hierarchy). In order to calculate the ratio, two different levels of aggregation need to be combined. First the sales for each product and second the total sales of all products per country. In a semantic plan these requirements map to the following views: one view which aggregates at product and country level and another view aggregates product totals at country level. The top node joins these two aggregated nodes on country and calculates the ratio. Additionally, the final view filters on region EMEA. FIG. 9 shows an example semantic execution plan to calculate ratios on different aggregation levels.

Besides ratios and subtotals arbitrary complex calculations can be expressed using the semantic layer. Further examples are distinct counts, e.g. of customers who at least bought one product of a certain type. Also unit conversion, Unions of multiple cubes, averages and subtotals can be expressed using the capabilities of the semantic layer.

However, the semantic layer is not tied to the previously mentioned types of queries. The general concept to stack database views on top of each other and combine them using typical high-level database operators is powerful enough to express not only typical OLAP calculations, but also planning and other sophisticated functionality.

Planning Operations

Figure 10:
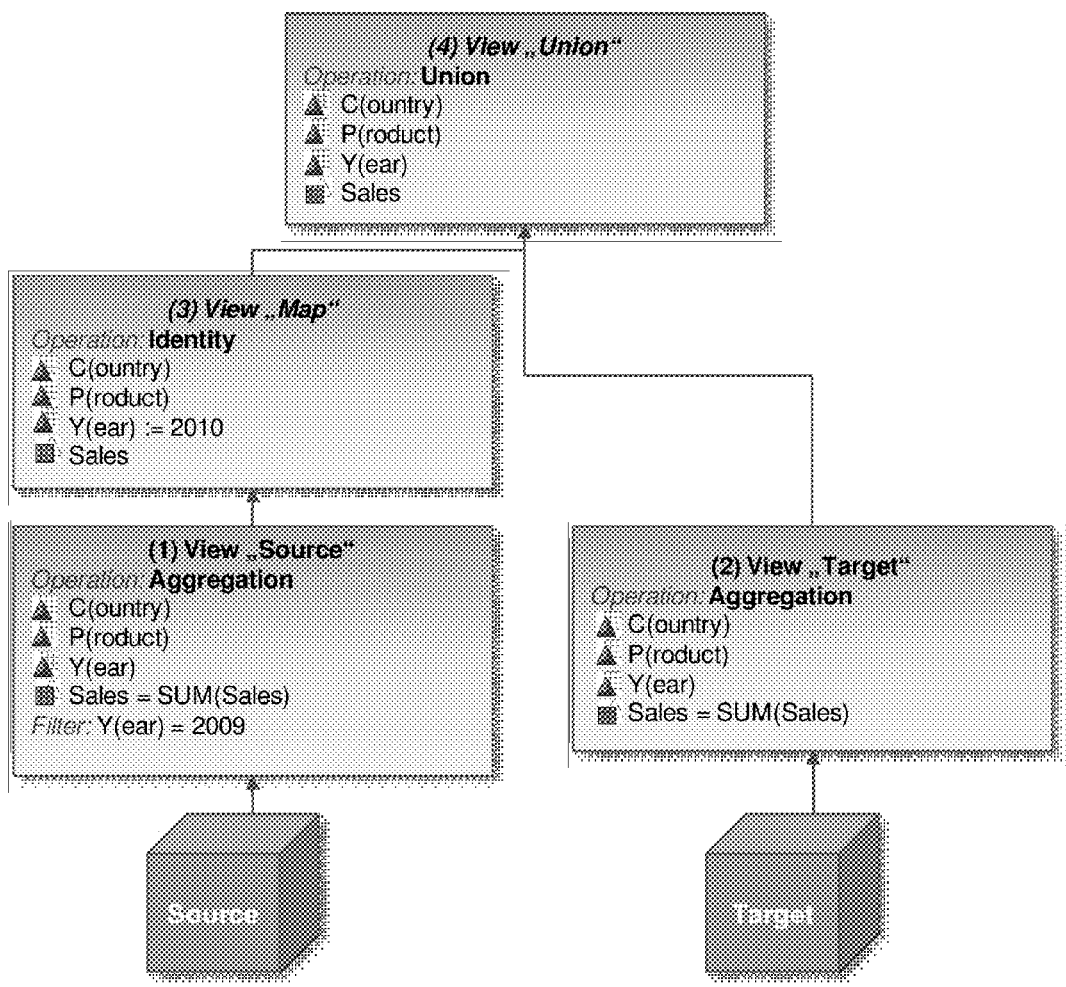
FIG. 10 shows another example semantic execution plan.

Planning functions in DB may be expressed using the semantic layer. Each planning function maps to a semantic plan that logically describes how the result of a planning function is obtained from a given source. For many typical planning functions the existing features and provided operations of the semantic layer are already sufficient to express them. As an example, copying data from a source cube into a non empty target cube gets translated into a semantic plan that first maps one or more dimensions from one value to another shown in view "map" in FIG. 10, which shows an example semantic plan. Afterwards, the plan calculates a union of that result with the target cube. The corresponding plan is shown in FIG. 10.

However some planning functions require an extension of the semantic layer. For example as a counterpart of the aggregation operation a disaggregation operation is an important functionality in a planning scenario and therefore introduced as a native semantic operations. Furthermore a forecasting operation might be another operation supported by the semantic layer. Other operations will follow. Although new operations are necessary, the overall goal is to have the semantic layer provide a preferably minimal set of generic operations that are powerful enough to express all the functionality.

Late Execution

Another concept for processing the semantic plan (especially in conjunction with planning) layer is late execution. The semantic plan is a logical description of how data is transformed from actual source data into the required result. The planning process can be viewed as a long running transaction where data is taken from a source and then transformed and replicated. That is the planning process can be modelled logically as a semantic plan. The semantic plan represented as a dataflow graph gets extended during each planning step with a set of views that logically express the effect of a planning function. Therefore each planning step can be executed fast since only the logical execution directive is stored. The execution of the semantic plan is deferred until query execution time. Since a query often selects only a subset of the (planned) data and often only on an aggregated level, the execution of the semantic plan at query time offers potential for optimization, e.g. to push down filters within the plan or prune the semantic plan if some of the views are not necessary to calculate the requested result. However, since this is transparent to the application, there is always the possibility to materialize intermediate results that are expensive to calculate. Furthermore the application itself can request a materialized snapshot of the current planning results to ensure consistency for subsequent operations.

Language Support—A Planning Language (FOX)

Common planning functions like copy and disaggregate are only one part of planning applications. In the Integrated Planning (IP) infrastructure a language (e.g., called FOX) is provided to implement custom planning functions that may not be expressed using standard functions. This is a good example of a Domain Specific Language (DSL) in general. It represents a data centric procedural language that operates on tuples. DB may include a general mechanism to compile a (procedural) DSL to a semantic plan that can be executed directly within DB (e.g., after compiling into a physical execution plan as mentioned above).

A planning scenario consists of operations, which will be natively supported by the engine like copy and disaggregate, operations for selecting or accessing data, which can be expressed by SQL or MDX and complex planning functionality, expressed in a language such as FOX. The complete execution plan for this scenario can be formulated in a semantic execution plan.

Integrating Language (e.g., FOX) into a Semantic Execution Plan

In principal for many of the procedural concepts in FOX there is declarative counterpart that can be expressed using the semantic layer. Conditions are transformed to filters, loops can often be unrolled using joins or are expressed using the implicit for-each semantic of each view. Calculations map to calculated expressions within a view. As an example the following FOX-Script calculates the revenue for each article, country and year based on the quantity multiplied with the price per article. The article prices are stored as facts for each article regardless of country and year (# not assigned value).

Figure 11:
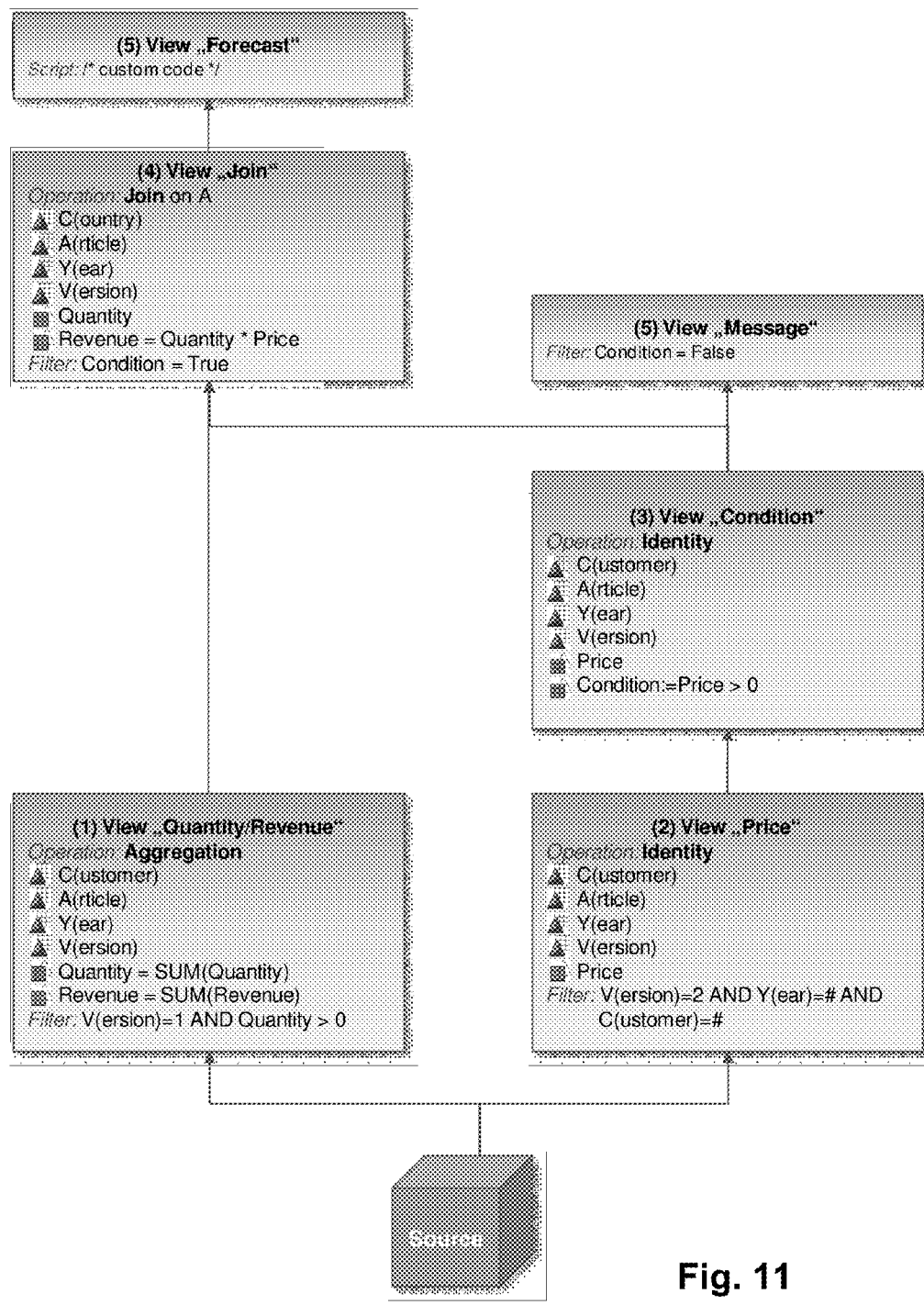
FIG. 11 shows an example semantic execution plan for a script.

This script gets translated to the semantic executing plan in FIG. 11. As can be seen the FOREACH loop is implicitly expressed within the join-view that calculates the expression quantity*price for each tuple in the input dataset. The conditions are model as filters on data values or expression results.

Although there are many procedural expressions that can be described in a declarative way, there are other cases which cannot.

lation since it has two flavors: (1) the template plan that is shown above which lists all possible attributes that could be part of the result (i.e., dimensions and key-figures) and (2) a concrete instantiation of the template with a query which is executed during runtime. This concept makes the Calculation Engine powerful since different concrete calculations can be derived from only one template.

To demonstrate the template instantiation mechanism imagine that we want to ask for the number of customers grouped by country that have bought "Product='x'". It is possible to express this query using an additional view on top of view (2) that has the type projection (see view (3) "Request" in the FIG. 13). Moreover, during instantiation, all attributes that are not required to answer the query (i.e., "Customer", "Product", and "Year") are removed from all views if allowed. For example in FIG. 13, three attributes "Customer", "Product", and "Year" are removed from view (2). However, only two attributes "Product" and "Year" are removed from view (1) since "Customer" cannot be removed as this would change the semantics of the plan. This is denoted by the sign "+" for the dimension attribute "Customer" in view (1) in the template plan (see FIG. 12). The result of the instantiation is the semantic plan shown in FIG. 13.

```
IF {PRICE, 2, #, #, ARTICLE} = 0.
   MESSAGE . . .
ELSE.
   FOREACH GJAHR, CUSTOMER, ARTICLE.
      IF {QTY, 1, GJAHR, CUSTOMER, ARTICLE} > 0.
         {REV, 1, GJAHR, CUSTOMER, ARTICLE} = {QTY, 1, GJAHR, CUSTOMER, ARTICLE }
*
                                    {PRICE, 2, #, #, ARTICLE}.
      ENDIF.
   ENDFOR.
ENDIF.
Listing 1: simple FOX formula
```

Therefore operations in the semantic execution plan can contain script snippets, which may need to be executed by the execution engine. These plan operations get input data and produce output data as the predefined semantic operations. For example, code snippets can contain a sophisticated data processing function for example in the previous example one might want to implement a custom forecasting function that calculates sales quantities per article and country for subsequent years. Further examples are loops with dynamic exit conditions.

Calculation Engine

The calculation engine enables complex analytical queries on top of one or several cubes that are structured using a star schema. As described, the idea is to stack so called views on top of cubes whereas each view describes an operation like an aggregation or a join and references one or multiple other views or data sources.

Figure 12:
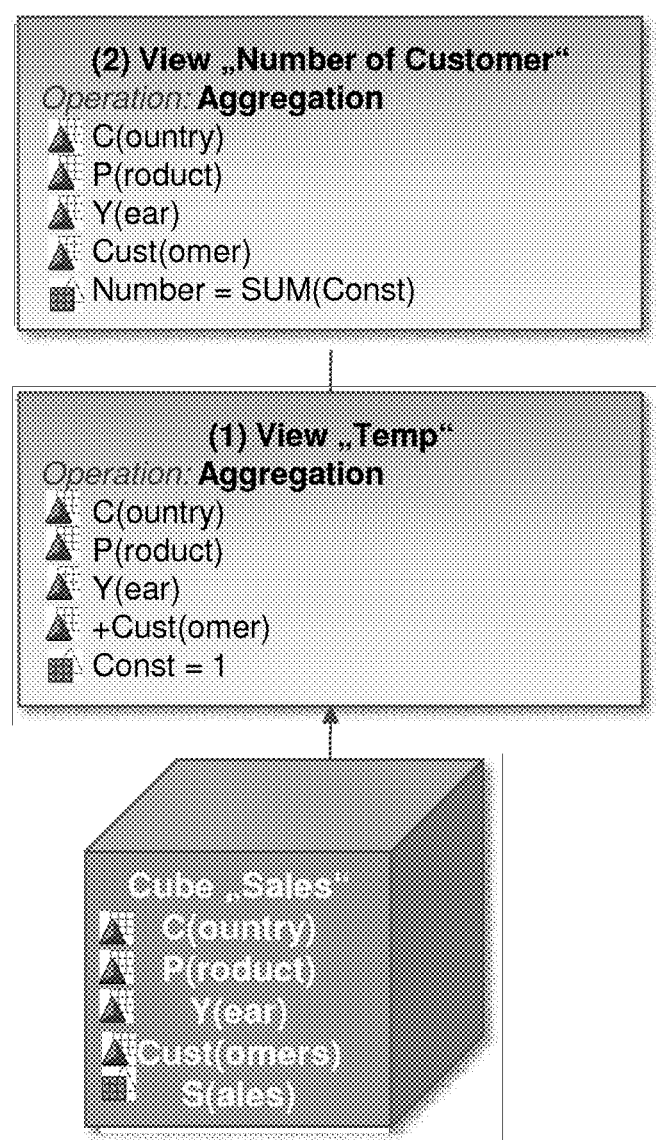
FIG. 12 shows an example semantic plan for count distinct.
Figure 13:
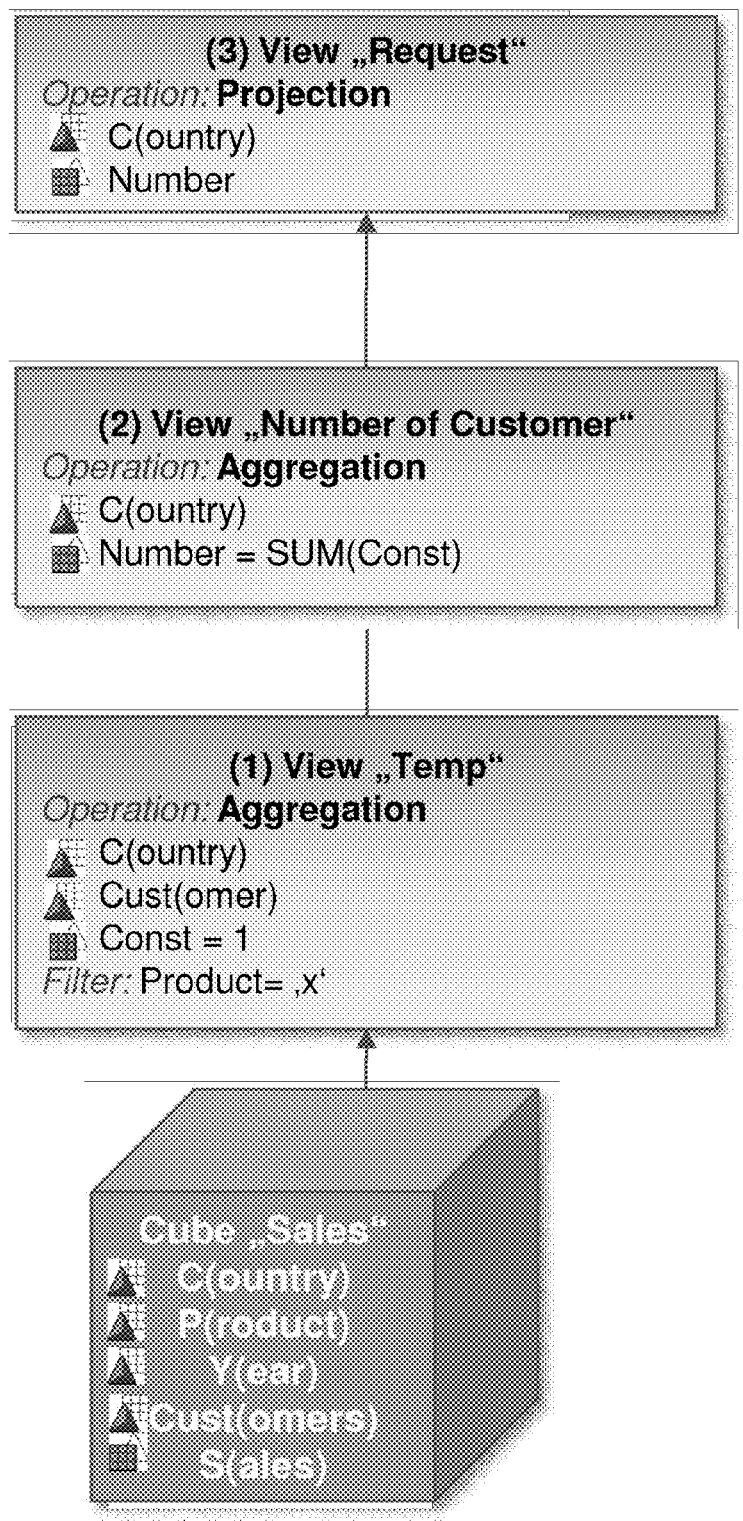
FIG. 13 shows an example semantic plan for template instantiation.

FIG. 12 shows an example semantic plan for count distinct. The example in FIG. 12 shows a semantic plan to calculate the distinct number of customers that bought a particular product in a given country and year. This scenario (i.e., aggregation on top of an aggregated result) is another typical use case for the calculation engine.

The example in FIG. 12 might raise the question why view (1) "Temp" is required? Actually, it would be sufficient to count the number of distinct customers grouped by country, product, and year in the Sales cube. The reason is that a semantic plan can represent different concrete calcu- Before the semantic plan is executed the plan is optimized. In this example, one possible optimization is that the filter of the query "Product='x'" is pushed down into the cube. After optimization, a physical execution plan is generated (i.e., the different operations of a calculation are mapped to physical plan operations like aggregation, join, union, etc). Moreover, for some operations in a semantic plan, a (more granular) physical plan which consists of several physical operations might be generated and executed (i.e., plan in the plan). Other embodiments may have one physical plan only.

Therefore, a semantic plan may include several Calculation Views. Each view references one or multiple inputs. An input could be an existing DB source or another calculation view. The Calculation View is described by its operation and the attributes it exposes. The Calculation View may have filters and sorting attributes. Additionally calculated attributes can be defined on each view. Moreover, each view in the semantic plan graph can potentially be the entry point for a query. That is, a query can be executed on a view independent whether this view is the root of the plan or not. Furthermore within a template, special constructs (e.g., force-group-by-flags, etc.) and keywords (e.g., ALL-keyword) may be used to keep a template plan generic (e.g., independent of a concrete data source). Together with a query, a template plan may be instantiated, optimized and finally executed.

Low Level Virtual Machine (LLVM)

A Low Level Virtual Machine provides a compiler and runtime infrastructure. Its architecture is based on a virtual instruction set that uses simple RISC-like instructions, but provides rich, language-independent, type information and dataflow information about operands. This combination enables sophisticated transformations on object code, while remaining light-weight enough to be attached to the executable. This combination may be used to allow link-time, run-time, and offline transformations. LLVM's infrastructure is separated into a compiler front-end, a link-time optimization framework, static back-ends for many real processor architectures and a virtual machine with just-in-time compiler. The front-end converts a high level programming language (e.g., C, ObjectiveC, C++, Python) into virtual instructions. As the front-end that defines the application language is exchangeable, the DB may use its own language or even support many of these. Once the virtual instructions are generated the code can be already executed in the virtual machine. For faster execution several optimization steps can be applied. These include strategies like static optimization of the virtual code, assembly into native processor code or just-in-time compilation during execution. All the functionalities are available as separate libraries and can be embedded selectively. The code that is generated from the embedded compiler can call functions of the embedding program. So application code can access the DB internal functionality efficiently. An object oriented implementation of the LLVM modules allows the instantiation of several virtual machines inside the same process and the parallel execution of virtual code at the same time without interference.

Further Examples and Applications

Embodiments of the present disclosure allow applications to run data-intensive functionality inside a DB instead of running them in the application server, for example, to avoid massive data copies to the client and leverage sophisticated parallel execution strategies. SQL alone as a Query Language may not be adequate for expressing many application scenarios because SQL is limited to only one "complex" statement at a time, one "flat" result at a time, suffers from missing features (error handling, branching, . . . ), and SQL is sometimes too verbose. Further, Database Stored Procedures do not leverage benefits of databases sufficiently, Imperative code is hard to optimize, and Developers typically do not think set-oriented but tuple-oriented.

Applications of certain embodiments include Mass data runs (e.g., dunning run), Analytics in the database (SAP BW, CRM Segmentation Builder, Analytic Enablement Objects (subset) . . . ), and other new applications (e.g., online "data-intensive logic", BRF like transformations).

Implementations of the disclosed embodiments may includes a language that is set-oriented instead of tuple-oriented to enable efficient parallel processing, a language that supports constructs without side effects which enable parallel processing (no direct write-back), is data-centric functions such as queries and updates should be formulated in a declarative way (using extended DB SQL), safe (e.g., no crashes, no endless loops), and has no call-backs into application server (only in/out paradigm), for example.

Figure 14:
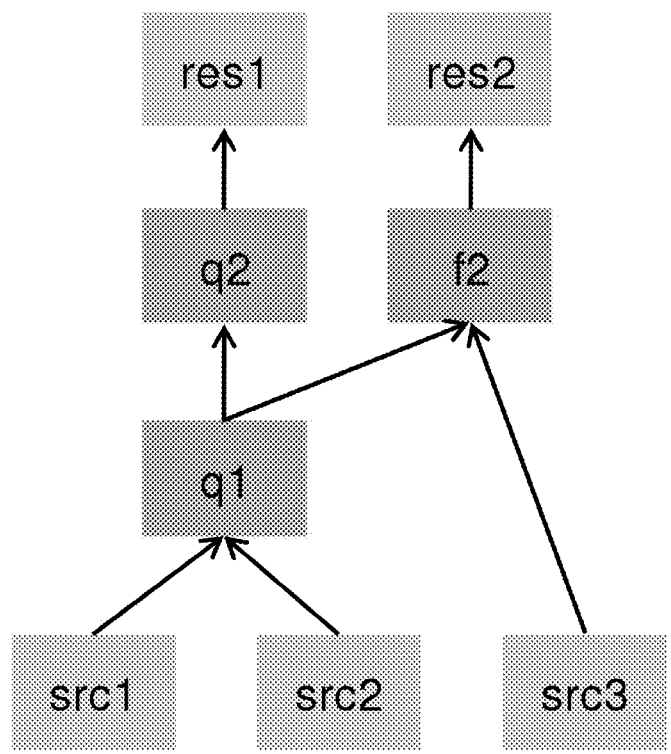
FIG. 14 shows an example SQL script represented as an acyclic directed data-flow graph.

A SQL script may be represented as a sequence of data transformations (encapsulated as a function). Transformation can be defined as queries or other functions (for reuse), for example. A SQL script can be represented as an acyclic directed data-flow graph as illustrated in FIG. 14. The following is an example script:

```
function f1(in1){
    tmp1 = q1( src1, src2, in1)
    res1 = q2(tmp1)
    res2 = f2(tmp1, src3)
    return {res1, res}
}
```

A language according to the present disclosure may support the following characteristics.
Data Model: Structured Relational
  Relations (i.e. tables with attributes)
  Associations (pre-defined and ad-hoc)
  Structured Sets of relations and associations (to represent BO's)
  Query language: Structured SQL ("A better SQL")
  Enable associations for joining and implicit joins
  Enable projection of named structures (e.g. BO nodes)
  Extensible by user-defined functions (projection and aggregation)
Additional Features:
  Data centric error-handling and eventing (i.e. errors and events are data)
  Explicit Branching (instead of filtering)
  Sequences (Number ranges, GUIDs, . . . )

A database system according to embodiments of the disclosure may run application scenario use an extended SQL. Transformation can be either SQL queries or other procedures (for reuse) and are extensible by business logic (i.e., user defined functions). FIG. 14 illustrates an example approach. The following is an example of a Dunning run implemented using a SQL script procedure according to an embodiment illustrated in FIG. 14:

```
Function Dunning( UUID company, Date dundate){
 Table trp_items = SELECT * FROM TradeRecPay->company->dun-
Schema
 WHERE company=$company;
 Table trp_conv = SELECT tgt_amt=
curr_conv( [src_curr, tgt_curr, src_amt], dundate ), trpitems.company.*
FROM trpitems;
 ErrorTable err = SELECT db_key+src_amt AS msg
 FROM trp_conv WHERE tgt_amt IS NULL;
 THROW err IF NOT EMPTY;
 Table dun_hd = SELECT SUM(tgt_amt), dunhd_seq.next( ) as db_key . .
.
 FROM trp_conv GROUP BY business_partner;
 Table dun_bd = . . .
 Association dun_assoc = SELECT db_key, parent_key FFROM dun_db;
 Return {dun_hd<-dun_assoc->dun_db} //Set of relations and associations
}
Function curr_conv(Table curr_table, Date curr_date) {. . .}
```

The following is the corresponding application code:

```
TRY{
    (bd, hd) = SELECT * FROM Dunning(companyid, dundate).
    . . .
}
CATCH( ErrorTable err) {
    //Do Error Handling here
    . . .
}
```

The system may further support:
1) User defined functions for projection/aggregation:
    Projection with and without windowing: SELECT my_fun(a, b) FROM T//my_fun(a,b)=a % b*2
    Aggregation:
        SELECT MEAN(sales) FROM T GROUP BY customer
    One environment to define functions in application server
    Can be reused in application programs and SQL scripts (use LLVM for execution)
2) Session temporary data:
    Store result temporarily for session in database
    Return subset of data to application (e.g., for eventing, user-interaction)
    Subsequent SQL-scripts in same session can consume temporary results
    Insert/update calls can write temporary data into database
    An extended version may support:
    Data-centric Eventing and Error Handling
    Associations, Named Projections, and User Defined Functions As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Other example implementations of a database according to embodiments of the present invention may include features disclosed in U.S. patent application Ser. No. 12/979,182, filed Dec. 27, 2010, entitled "Generic Nodes including stored script", naming Arne Harren, Tobias Elfner, Gerd Forstmann, Maciej Kabala, Carsten Binnig, Stefan Kain, Franz Faerber, and Till Westman as inventors, the entire disclosure of which is incorporated herein by reference in its entirety. Similarly, yet other example implementations of a database according to embodiments of the present invention may include features disclosed in U.S. Pat. No. 8,195,643, filed Oct. 28, 2010, entitled "Database Calculation Engine", naming Christoph Weyerhaeuser, Daniel Baeumges, Tobias Mindnich, and Thomas Legler as inventors, the entire disclosure of which is incorporated herein by reference in its entirety.

Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method, comprising:
    implementing a database executing on a computer system;
    receiving a data request from an application in the database executing on the computer system, the data request specifying standard structured query language (SQL) operations and custom application operations to be performed for said application, wherein the custom application operations include a plurality of functions, and wherein at least two of the plurality of functions are free of side effects;
    processing, on the computer system, the data request in a semantic layer of the database, the semantic layer processing the standard SQL operations and the custom application operations, and wherein, in response to receiving the data request, the semantic layer generates a logical execution plan comprising said standard SQL operations and said custom application operations;
    converting, on the computer system, the logical execution plan into a physical execution plan using algebraic transformations and cost based optimizations based on database statistics, wherein the physical execution plan comprises native executable database operations for performing the standard SQL operations and the custom application operations, and wherein the physical execution plan indicates that the at least two of the plurality of functions that are free of side effects are executed in parallel;
    executing the physical execution plan on the database, and in accordance therewith, generating a data result, wherein the at least two of the plurality of functions that are free of side effects are executed in parallel; and
    sending the data result from the database to the application.

2. The method of claim 1, further comprising:
    receiving, in the data request, a script specifying the custom application operations;
    parsing the request; and
    incorporating the custom application operations from the script into the logical execution plan.

3. The method of claim 2, wherein the script is incorporated into an acyclic graphical model comprising a plurality of nodes, each node representing an operation, wherein one or more nodes represent said custom application operations.

4. The method of claim 1, wherein the data request specifies a custom application planning operation.

5. The method of claim 4, wherein the planning operation is a disaggregation operation.

6. The method of claim 1, wherein the data request specifies a custom application multi-dimensional expression (MDX) operation.

7. The method of claim 1, wherein the custom application operations are specified in a procedural programming language.

8. The method of claim 7, wherein the procedural programming language accesses pre-stored objects in the database to perform one or more data operations.

9. The method of claim 1, wherein the data request specifies a custom application statistical operation.

10. A non-transitory computer readable storage medium embodying a computer program for performing a method, said method comprising:
    implementing a database executing on a computer system;
    receiving a data request from an application in the database executing on the computer system, the data request specifying standard structured query language (SQL) operations and custom application operations to be performed for said application, wherein the custom application operations include a plurality of functions, and wherein at least two of the plurality of functions are free of side effects;
    processing, on the computer system, the data request in a semantic layer of the database, the semantic layer processing the standard SQL operations and the custom application operations, and wherein, in response to receiving the data request, the semantic layer generates a logical execution plan comprising said standard SQL operations and said custom application operations;
    converting, on the computer system, the logical execution plan into a physical execution plan using algebraic transformations and cost based optimizations based on database statistics, wherein the physical execution plan comprises native executable database operations for performing the standard SQL operations and the custom application operations, and wherein the physical execution plan indicates that the at least two of the plurality of functions that are free of side effects are executed in parallel;

executing the physical execution plan on the database, and in accordance therewith, generating a data result, wherein the at least two of the plurality of functions that are free of side effects are executed in parallel; and sending the data result from the database to the application.

11. The non-transitory computer readable storage medium of claim 10, further comprising:
receiving, in the data request, a script specifying the custom application operations;
parsing the request; and
incorporating the custom application operations from the script into the logical execution plan.

12. The non-transitory computer readable storage medium of claim 11, wherein the script is incorporated into an acyclic graphical model comprising a plurality of nodes, each node representing an operation, wherein one or more nodes represent said custom application operations.

13. The non-transitory computer readable storage medium of claim 10, wherein the data request specifies a custom application planning operation.

14. The non-transitory computer readable storage medium of claim 10, wherein the data request specifies a custom application multi-dimensional expression (MDX) operation.

15. The non-transitory computer readable storage medium of claim 10, wherein the custom application operations are specified in a procedural programming language.

16. A system comprising:
one or more processors;
memory; and
one or more executable software components, executable by said processors to:
implement a database executing on a computer system;
receive a data request from an application in the database executing on the computer system, the data request specifying standard structured query language (SQL) operations and custom application operations to be performed for said application, wherein the custom application operations include a plurality of functions, and wherein at least two of the plurality of functions are free of side effects;
process the data request in a semantic layer of the database, the semantic layer processing the standard SQL operations and the custom application operations, and wherein, in response to receiving the data request, the semantic layer generates a logical execution plan comprising said standard SQL operations and said custom application operations;
convert the logical execution plan into a physical execution plan using algebraic transformations and cost based optimizations based on database statistics, wherein the physical execution plan comprises native executable database operations for performing the standard SQL operations and the custom application operations, and wherein the physical execution plan indicates that the at least two of the plurality of functions that are free of side effects are executed in parallel;
execute the physical execution plan on the database, and in accordance therewith, generating a data result, wherein the at least two of the plurality of functions that are free of side effects are executed in parallel; and
send the data result from the database to the application.

17. The system of claim 16, wherein the executable software components are further executable by said processors to:
receive, in the data request, a script specifying the custom application operations;
parse the request;
incorporate the custom application operations from the script into an acyclic graphical model comprising a plurality of nodes, each node representing an operation, wherein one or more nodes represent said custom application operations; and
incorporate the custom application operations from the script into the logical execution plan.

18. The system of claim 16, wherein the script is incorporated into an acyclic graphical model comprising a plurality of nodes, each node representing an operation, wherein one or more nodes represent said custom application operations.

19. The system of claim 16, wherein the data request specifies a custom application planning operation.

20. The system of claim 16, wherein the executable software components are further executable by said processors to:
compile one of the custom application operations into intermediate code;
when the one of the custom application operations is called a first time, compile the intermediate code into a runtime object for execution; and
when the one of the custom application operations is called a subsequent time, reuse the runtime object.

* * * * *